Patented Oct. 15, 1940

2,218,019

UNITED STATES PATENT OFFICE 2,218,019

(ARYLOXY-ALKYL) (THIOCYANO-ALKYL) ETHER

Gerald H. Coleman and Robert W. Sapp, Midland, Mich., assignors to The Dow Chemical Company, Midland, Mich., a corporation of Michigan No Drawing. Application September 14, 1938, Serial No. 229,871

4 Claims. (Cl. 260—454)

The present invention concerns a new class of compounds, namely, the (aryloxy-alkyl) (thiocyano-alkyl) ethers.

We have prepared compounds of the aforementioned class, determined certain physical properties thereof, whereby they may be readily identified, and found that they are particularly useful as insecticidal toxicants. These compounds are for the most part viscous, high-boiling, water-white liquids substantially insoluble in water, but somewhat soluble in most organic solvents.

The preparation of our new compounds can be accomplished by reacting an (aryloxy-alkyl) (halo-alkyl) ether with an alcoholic solution of an alkali metal thiocyanate. For example, a beta-aryloxy-beta'-halo-dialkyl ether, such as beta-(phenoxy)-beta'-chloro-diethyl ether and potassium thiocyanate are dissolved in absolute alcohol and the resulting solution heated to its boiling temperature under reflux for a period of time sufficient to accomplish the reaction. The reaction temperature is generally between 80° and 90° C., although somewhat lower or higher temperatures may be employed, the reaction being carried out under autogenous pressure where temperatures above the boiling point of the solution prevail. While any suitable proportions of the (aryloxy-alkyl) (halo-alkyl) ether compound and alkali metal thiocyanate may be employed, substantially equimolecular proportions thereof have been found to give the desired compound in good yield. The alcohol is preferably employed in amount sufficient to maintain the reactants and final ether product in solution. Following completion of the reaction, the mixture is cooled to room temperature, the major part of the alcohol solvent removed by distillation, and the residue diluted with water, whereupon a water-immiscible layer of the organic thiocyanate separates from solution. This layer is separated as by decantation, washed with water, and used either in its crude form or fractionally distilled to obtain the desired (aryloxy-alkyl) (thiocyano-alkyl) ether in substantially pure form.

The (aryloxy-alkyl) (halo-alkyl) ethers employed as reactants in the preparation of our new compounds are obtained by reacting metallic phenolates with di-(halo-alkyl) ethers under those conditions of temperature, pressure, and molecular proportion favoring the substitution of an aryloxy group for one only of the halogens of the di-(halo-alkyl) ether compound.

The following examples describe in detail the preparation of certain individual members of our new class of compounds, but are not to be construed as limiting the invention.

EXAMPLE 1.—*Beta - phenoxy-beta'-thiocyano-diethyl ether*

A mixture of 100.3 grams (0.5 mol) of beta-phenoxy-beta'-chloro-diethyl ether (boiling point 126°–128° C. at 4 mm. pressure), 53.4 grams (0.55 mol) of potassium thiocyanate, and 120 grams of absolute alcohol was heated at 83°–85° C., the boiling temperature of the solution, and under reflux for 20 hours. The reaction mixture was then cooled to room temperature, alcohol distilled off, the residue diluted with an excess of water, and the water-immiscible layer separated by decantation. This crude product was washed with water, dried, and fractionally distilled, whereby there was obtained 60 grams (0.269 mol) of beta-phenoxy-beta'-thiocyano-diethyl ether as a mobile liquid boiling at 163°–163.5° C. at 2 millimeters pressure, and having a specific gravity of 1.160 at 20°/4° C. A 3 per cent solution of this compound in kerosene, when tested by the Peet-Grady method, substantially as described in Soap, 8, No. 4, 1932, gave a knockdown of 96 per cent in 10 minutes and a kill of 67 per cent in 48 hours against three-day old house flies.

EXAMPLE 2.—*Beta-(2-ethyl-phenoxy)-beta'-thiocyano-diethyl ether*

In a similar manner, 197.1 grams (0.862 mol) of beta-(2-ethyl-phenoxy)-beta'-chloro-diethyl ether (boiling point 145°–147° C. at 4 mm. pressure), 83.8 grams (0.862 mol) of potassium thiocyanate, and 200 grams of absolute alcohol was reacted at 82° C. under reflux for 64 hours. Upon separation of the crude organic thiocyanate product, as described in Example 1, and fractionation, there was obtained 149 grams (0.592 mol) of beta-(2-ethyl-phenoxy)-beta'-thiocyano-di-, ethyl ether as a colorless liquid boiling at 188°–189° C. at 4 millimeters pressure and having the specific gravity 1.112 at 20°/4° C. A 3 per cent solution of this compound in kerosene, when tested according to the Peet-Grady method, gave a knockdown in 10 minutes of 100 per cent and a kill in 48 hours of 82 per cent of three-day old house flies.

In a similar manner, other (aryloxy-alkyl) (thiocyano-alkyl) ethers were prepared and tested as fly spray materials. Representative of such compounds are the following:

Beta - (4-tertiarybutyl-phenoxy) - beta' - thiocyano-diethyl ether, a mobile liquid boiling at 201°–202° C. at 3 millimeters pressure and having the specific gravity 1.081 at 20°/4° C. A 3 per cent kerosene solution of this compound knocked down 100 per cent of the flies in 10 minutes and killed 90 per cent in 48 hours.

Beta - (2 - methyl-5-isopropyl-phenoxy)-beta'-thiocyano-diethyl ether, a colorless liquid boiling at 205°–206° C. at 4 millimeters pressure and having the specific gravity 1.078 at 20°/4° C. A 3 per cent solution of this compound in kerosene gave a 10 minute knockdown of 100 per cent and a 48 hour kill of 92 per cent of three-day old house flies when tested according to the Peet-Grady method.

Beta-(2 - phenyl-phenoxy) - beta' - thiocyano - diethyl ether, a high-boiling, viscous liquid having a boiling point of 226°–228° C. at 3 millimeters pressure and the specific gravity 1.174 at 20°/4° C. A 3 per cent kerosene solution of this compound knocked down 84 per cent in 10 minutes and killed 65 per cent in 48 hours of three-day old house flies against which it was tested according to the Peet-Grady method.

Beta'-(2'-phenyl-4-isopropyl-phenoxy) - beta' - thiocyano-diethyl ether, a viscous, amber liquid boiling at 255°–260° C. at 4 millimeters pressure.

Beta-(2-cyclohexyl-phenoxy)-beta'-thiocyano-diethyl ether, an amber liquid boiling at 225°–232° C. at 4 millimeters pressure and having a specific gravity of 1.104 at 20°/4° C.

In a similar manner, (aryloxy-alkyl) (thiocyano-alkyl) ethers may be prepared such as beta - naphthoxy-beta' - thiocyano-diethyl ether, beta - phenanthroxy - beta' - thiocyano - diethyl ether, gamma - (4-allyl-phenoxy)-gamma'-thiocyano-dipropyl ether, beta-(4-benzyl-phenoxy)-beta'-thiocyano - dibutyl ether, delta-(2-propyl-phenoxy)-delta' - thiocyano - dibutyl ether, (3,5-dimethyl-phenoxy)-thiocyano-diamyl ether, (2-methyl-phenoxy)-thiocyano-diamyl ether, (beta-4 - normal-hexyl-phenoxy - ethyl) (delta' - thiocyano - butyl) ether, beta - (2 - normal - octyl-phenoxy)-beta'-thiocyano-diethyl ether, beta-(4-phenyl - phenoxy)-beta'-thiocyano-diethyl ether, and the like.

The compounds with which this invention is particularly concerned are those having the following formula:

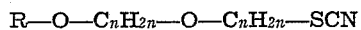

$$R-O-C_nH_{2n}-O-C_nH_{2n}-SCN$$

wherein R represents an aryl group, and each $n$ is an integer.

We claim:

1. A (mono - alkyl - phenoxy-alkyl) (thiocyano-alkyl) ether, wherein the alkyl radical attached to the benzene nucleus contains from 2 to 6 carbon atoms, inclusive.

2. A beta - (mono - alkyl-phenoxy)-beta'-thiocyano-diethyl ether, wherein the alkyl radical contains from 2 to 6 carbon atoms, inclusive.

3. Beta - (2 - ethyl-phenoxy)-beta'-thiocyano-diethyl ether.

4. Beta-(4-tertiarybutyl-phenoxy)-beta'-thio-cyano-diethyl ether.

GERALD H. COLEMAN.
ROBERT W. SAPP.